Dec. 10, 1929.  F. SWOYER  1,739,333
AUXILIARY TANK FOR MOTOR VEHICLES
Filed July 17, 1928  2 Sheets-Sheet 1
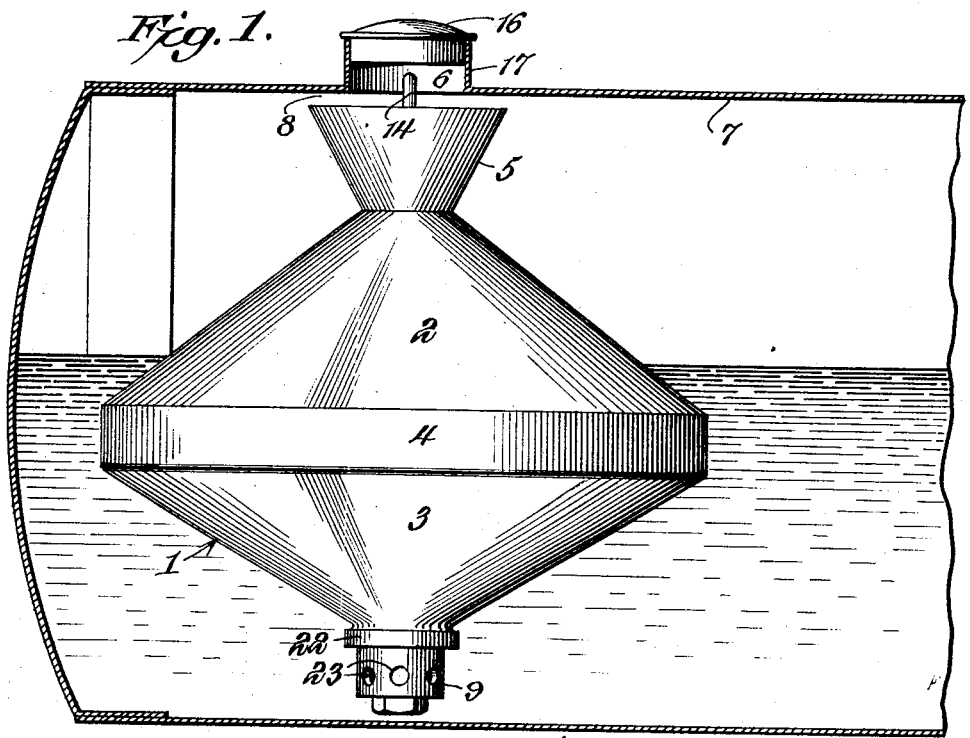
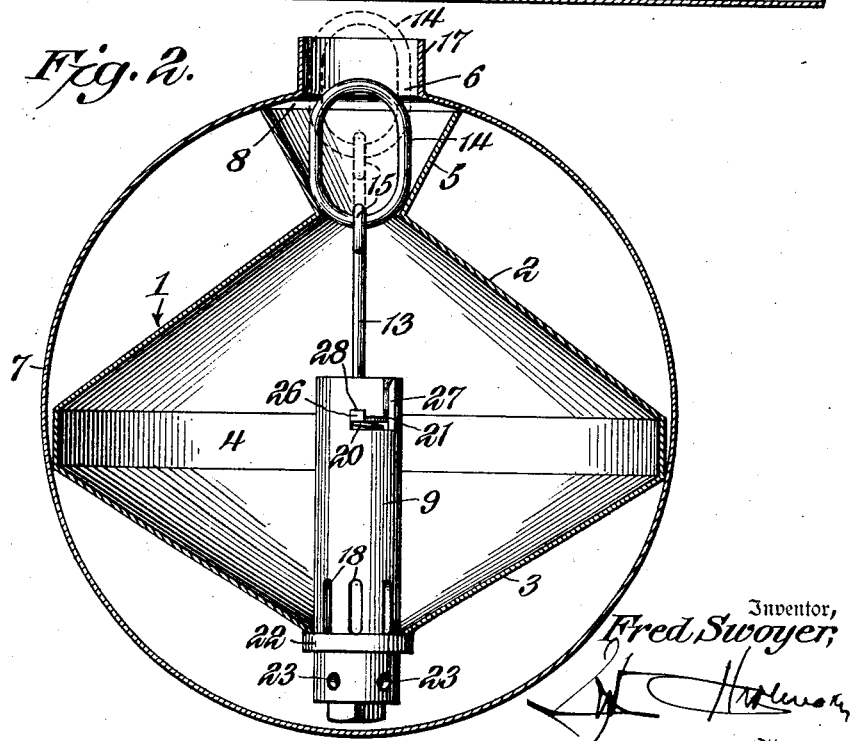
Inventor,
Fred Swoyer,
Attorney Dec. 10, 1929.  F. SWOYER  1,739,333
AUXILIARY TANK FOR MOTOR VEHICLES
Filed July 17, 1928   2 Sheets-Sheet 2
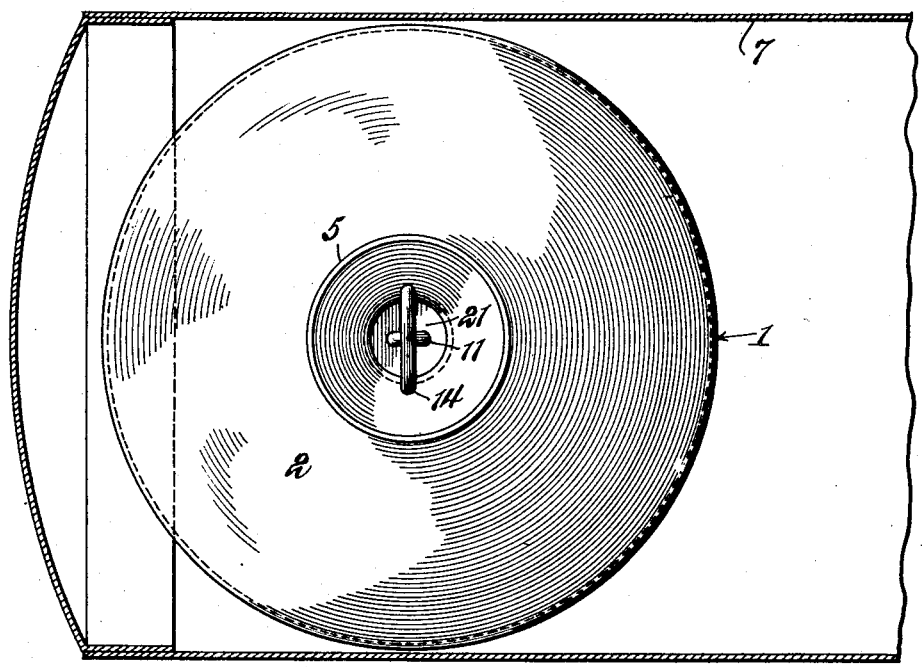
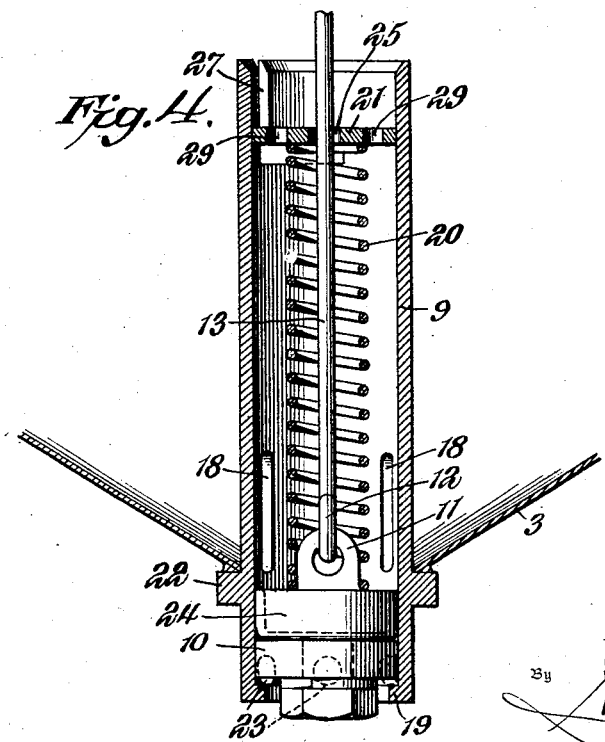
Inventor,
Fred Swoyer,
By
Attorney Patented Dec. 10, 1929

1,739,333

UNITED STATES PATENT OFFICE

FRED SWOYER, OF SILVER GROVE, KENTUCKY

AUXILIARY TANK FOR MOTOR VEHICLES

Application filed July 17, 1928. Serial No. 293,442.

The invention relates to an auxiliary tank for automobiles and other motor vehicles.

The object of the present invention is to improve the construction of reserve or auxiliary fuel tanks for automobiles, motor boats and other motor vehicles and to provide a simple, practical and efficient auxiliary gasoline tank designed to be contained within the main fuel tank of an automobile and located adjacent the filling opening of the main fuel tank in position to be filled first before any of the gasoline is permitted to flow into the main tank and capable of retaining substantially its entire contents while an automobile operates at any safe angle and capable of being quickly and completely drained of its contents when the automobile or other motor vehicle is either in a horizontal position or at any safe angle.

Another object of the invention is to equip the auxiliary tank with a valve mechanism which will be noiseless and which will also be gasoline-tight and self-cleaning, to prevent accumulation of particles of dirt which cause leakage of gasoline with valves of the ordinary type. The specific construction of the valve, however, forms the subject matter of a co-pending application, filed July 17, 1928, Serial No. 293,443.

With these and other objects in view, the invention consists in the construction and novel combination and arrangement of parts hereinafter described, illustrated in the accompanying drawings, and set forth in the claims hereto appended, it being understood that various changes in the form, size and minor details of construction, within the scope of the claims, may be resorted to without departing from the spirit of the invention or sacrificing any of the advantages thereof.

In the drawings:

Figure 1 is a side elevation of an auxiliary gasoline tank constructed in accordance with this invention and shown applied to a main fuel tank, the latter being in section.

Fig. 2 is a transverse sectional view of the same, the valve mechanism being shown in elevation.

Fig. 3 is a horizontal sectional view through the main fuel tank, the auxiliary fuel tank being shown in plan view.

Fig. 4 is a vertical sectional view through the valve mechanism and the bottom of the auxiliary tank.

Fig. 5 is a detail view of the operating mechanism of the valve.

In the accompanying drawings, in which is illustrated the preferred embodiment of the invention, 1 designates an auxiliary gasoline tank of substantially double conical formation and consisting of an upper inverted conical section 2, a lower conical section 3 and a central cylindrical connecting portion 4. The auxiliary tank is circular in horizontal section, and the upper section 2 is truncated at the top and is provided with a downwardly tapered upwardly flaring neck 5 of greater diameter at the top than the filling opening 6 of a main fuel tank 7 in which the auxiliary tank is secured by spot welding or other suitable means. The main fuel tank is preferably cylindrical, but may be of any other desired configuration, and the neck 5 fits against the fuel tank at the top at opposite sides thereof, as clearly illustrated in Fig. 2 of the drawings, and ample space 8 is provided between the upper edge of the neck 5 and the main fuel tank intermediate the said contacting portions to permit gasoline from an ordinary filling tube of a gasoline station to flow freely into the main fuel tank after the auxiliary tank has been filled and overflows.

The auxiliary fuel tank, which may be constructed of any suitable material, is of a size sufficient to contain a gallon of gasoline, and the inclination of the upper walls of the gasoline tank formed by the conical section 2 is sufficient to prevent the contents of the auxiliary tank from flowing from the auxiliary tank into the main tank at any safe angle at which an automobile may be operated, and as the auxiliary tank is circular in horizontal section, the inclination of the automobile in any direction will not affect the operation of the auxiliary tank when the machine is at any safe angle of operation.

The lower end walls formed by the conical section 3 insure a complete drainage of the entire contents of the auxiliary tank when the automobile is at any safe angle, so that the operator of an automobile is assured of a full gallon of gasoline when the contents of the auxiliary tank is emptied into the main tank. This amount will generally be sufficient to enable a machine to reach a filling station before the fuel is completely exhausted.

The lower section 3 of the auxiliary tank is truncated to receive a valve cylinder 9 of a self-cleaning, gasoline-tight piston valve. The piston valve comprises in it construction the said cylinder 9 and a valve piston 10 constructed as set forth in the aforesaid application and provided at the top with a perforated lug 11 forming an eye into which is linked an eye 12 of the lower end of a rod 13 to the upper end of which is connected a pull ring 14. The rod 13, which is provided at its upper end with an eye 15 into which the pull ring 14 is linked, extends upwardly through the cylinder 9 to the lower end of the downwardly tapered neck 5 and the pull ring 14 is arranged within the neck in position to be readily grasped by the operator when the cap 16 is removed from the filling opening. The ring extends into the filling orifice, which is surrounded by the usual annular flange 17, and the cap fits within the upper end of the latter in the ordinary manner and may be secured in its closed position by any suitable means.

The cylinder is provided at its lower portion with vertical slots 18 located above the bottom of the auxiliary tank and forming passages to permit the gasoline contained within the auxiliary tank to flow into the cylinder 9 and through the lower portion of the same when the piston 10 of the valve is lifted from the position illustrated in Fig. 4 to a point above the slots 18. The cylinder 9 is open at the lower end and is provided thereat with an inwardly extending annular flange 19 which is adapted to limit the downward movement of the valve to facilitate assembling of the same and to prevent a coiled spring 20 from forcing the piston out of the lower end of the cylinder when assembling the parts and when securing the valve in the auxiliary tank. The spring is interposed between the piston 10 and a removable stop 21 and operates to urge the piston 10 downwardly and maintain the same normally in its closed position. The cylinder 9 is provided adjacent its lower end with an exterior annular flange 22 which is brazed or welded or otherwise secured to the bottom of the auxiliary tank, as clearly indicated in the drawings, and the piston extends through the bottom of the auxiliary tank, and the cylinder is provided above the flange 19 with an annular series of perforations 23 which, together with the opening defined by the flange 19, is of greater area than the cross section of the passage of the cylinder 9, so that the gasoline will flow freely and quickly from the auxiliary tank into the main tank when the valve piston 10 is lifted above the slots 18 for draining the auxiliary tank. When the operator lifts the valve piston by the ring 14 to empty the auxiliary tank, and releases said ring 14 after the tank is drained the spring immediately returns the valve to its closed position so that it is impossible to fill the main tank without first filling the auxiliary tank, as the valve remains open only so long as it is manually held in such open position and as the hand of the operator is over the filling opening while the auxiliary tank is being emptied, gasoline cannot be supplied to the main tank and auxiliary tank until the operator releases the valve and removes his hand from the filling opening.

When the valve is closed, it is arranged in spaced relation to the stop flange 19 and is held in such spaced relation against the action of the coil spring 20 by the pull ring 14 engaging the lower end of the tapered neck. This will prevent noise and rattling, which might occur if the piston were permitted to fit against the flange of the cylinder. The piston valve is self-cleaning and the piston always closes on a clean seat, as any accumulation of dirt will be forced downwardly by the valve piston 10 in its closing movement. When the valve is closed the piston occupies a position between the lower ends of the slots 18 and the lower end of the valve cylinder. The valve piston, as explained in the said application, is provided with a cup leather 24 which expands slightly through absorption of gasoline and maintains a gasoline-tight joint or connection between the piston and the cylinder and prevents any leakage of the gasoline from the auxiliary tank into the main fuel tank.

The removable stop, which is provided with a central opening 25 for the passage of the rod 13, consists of a disc or plate fitting the interior of the cylinder and provided at diametrically opposite points with projecting lugs 26 which detachably engage substantially bayonet slots 27 in the opposite walls of the valve cylinder.

The bayonet slots 27, which are substantially L-shaped, each consists of a vertical branch and a horizontal branch, the latter being provided at its inner end with a vertical extension 28, and the spring holds the lugs in the vertical extensions 28 of the slots when the stop plate is in its normal position. The stop plate is provided with spaced openings 29, which are adapted to receive a suitable tool or tools to enable the stop plate to be readily rotated and manipulated to carry the lugs from the vertical extensions of the horizontal branches of the slots to the vertical branches thereof. This will enable the valve mechanism, with the exception of the cylinder, to be removed as a unit should removal of the cup leather become necessary. The other parts of the valve are metal and practically indestructible, and removal of the valve will be necessary only when the cup leather is to be removed.

What is claimed is:

1. The combination with a main fuel tank provided at the top with a filling opening, of an auxiliary fuel tank arranged within the main fuel tank below the filling opening thereof and having oppositely tapered upper and lower portions and provided at the top with a downwardly tapered neck of greater diameter at the top than the filling opening of the main tank, and valve mechanism for controlling the flow of fuel from the auxiliary tank into the main tank having an operating handle located within the tapered neck, the said tapered lower portion of the auxiliary tank being adapted to secure complete drainage of the auxiliary tank when the main tank is empty and while the machine is either in a horizontal position or at any safe angle and the tapered upper portion being adapted to retain the contents of the auxiliary tank within the same.

2. The combination with a main fuel tank provided at the top with a filling opening, of an auxiliary fuel tank of substantially double conical formation having an upwardly tapered top portion and a downwardly tapered bottom portion, said auxiliary fuel tank being arranged within the main fuel tank and provided at the top with an upwardly flaring neck of greater diameter at the upper edge than the filling opening of the fuel tank, the said tapered auxiliary tank being adapted to secure complete drainage of its contents when the main tank is empty and while the machine is either in a horizontal position or at any safe angle, and a valve for controlling the flow of fuel from the auxiliary fuel tank into the main fuel tank having an operating handle arranged within the said neck.

3. The combination with a main fuel tank provided at the top with a filling opening, of an auxiliary fuel tank of substantially double conical formation having an upwardly tapered top portion and a downwardly tapered bottom portion, said auxiliary fuel tank being arranged within the main fuel tank and provided at the top with an upwardly flaring neck of greater diameter at the upper edge than the filling opening of the fuel tank, the said tapered auxiliary tank being adapted to secure complete drainage of its contents while the machine is either in a horizontal position or at any safe angle, and a spring actuated valve for controlling the flow of fuel from the auxiliary tank into the main tank, said valve having an operating member located within the said neck and normally held against the same by the said spring to limit the travel of the valve and prevent noise.

4. The combination with a substantially cylindrical main fuel tank, of an auxiliary fuel tank of substantially double conical formation arranged within the main fuel tank beneath the filling opening thereof and provided at the top with a downwardly tapered neck of greater diameter at the top than the filling opening of the main tank and contacting therewith at opposite sides of the filling opening and forming spaces between the said neck and the top wall of the main tank to permit the fuel to flow into the main tank after filling the auxiliary tank, the said tapered auxiliary tank being adapted to secure complete drainage of its contents when the main fuel tank is empty and while the machine is either in a horizontal position or at any safe angle, and valve mechanism for controlling the flow of the fuel from the auxiliary tank into the main fuel tank having an operating member located within the said neck.

In testimony whereof I have hereunto set my hand this 13th day of July, 1928.

FRED SWOYER.